(12) United States Patent
Plöchinger

(10) Patent No.: US 9,976,922 B2
(45) Date of Patent: May 22, 2018

(54) FLUID PRESSURE SENSOR

(71) Applicant: Plöchinger Patent, Freinberg (AT)

(72) Inventor: Heinz Plöchinger, Freinberg (AT)

(73) Assignee: Plöchinger Patent, Freinberg (AT)

( * ) Notice: Subject to any disclaimer, the term of this patent is extended or adjusted under 35 U.S.C. 154(b) by 271 days.

(21) Appl. No.: 14/846,704

(22) Filed: Sep. 4, 2015

(65) Prior Publication Data

US 2016/0069764 A1    Mar. 10, 2016

(30) Foreign Application Priority Data

Sep. 5, 2014    (DE) .......................... 10 2014 012 918

(51) Int. Cl.
*G01L 9/12*    (2006.01)
*G01L 9/00*    (2006.01)
*G01L 13/02*   (2006.01)
*G01L 19/04*   (2006.01)

(52) U.S. Cl.
CPC .......... *G01L 9/0072* (2013.01); *G01L 9/0075* (2013.01); *G01L 13/025* (2013.01); *G01L 19/04* (2013.01)

(58) Field of Classification Search
CPC ... G01L 9/0072; G01L 9/0075; G01L 13/025; G01L 19/04; G01L 7/00
USPC ........................... 73/718, 715, 716, 717, 700
See application file for complete search history.

(56) References Cited

U.S. PATENT DOCUMENTS 3,484,732 A * 12/1969 Postma ................. G01L 1/2218
                                                    338/4
4,785,669 A * 11/1988 Benson ................. G01L 9/0072
                                                    73/718
6,425,290 B2 * 7/2002 Willcox ................ G01L 9/0007
                                                    73/715
6,837,112 B2 * 1/2005 Ferran .................. G01L 9/0072
                                                    73/718
8,276,457 B2 * 10/2012 Philipps ................ G01L 19/02
                                                    73/716
8,333,118 B2 * 12/2012 Blankenship ......... G01L 9/0072
                                                    73/718
8,604,565 B2 * 12/2013 Fujii .................... G01L 9/0005
                                                    257/415

FOREIGN PATENT DOCUMENTS

| DE | 102008042648   | * 10/2008 | ........... G01L 9/0072 |
| DE | 102008042648 A1 | 4/2010 | |
| EP | 0990127 B1     | 9/2002   | |
| EP | 1218713 B1     | 11/2006  | |
| EP | 1309840 B1     | 6/2010   | |
| WO | 2006041719     | 4/2006   | |

* cited by examiner

*Primary Examiner* — Manish S Shah
*Assistant Examiner* — Nigel Plumb
(74) *Attorney, Agent, or Firm* — Smartpat PLC

(57) ABSTRACT

The disclosure relates to a pressure sensor for measuring a fluid pressure, in particular a vacuum pressure. The pressure sensor contains a first and a second diaphragm connected to one another such that they enclose and hermetically seal a fluid space. Fluid can enter and exit the fluid space through a fluid supply element, which is connected to an exterior opening of the sensor. Each of the diaphragms is proximal to a reference electrode and forms a variable capacitor, the capacitance of which depends on the position of the diaphragms, which in turn depends on the pressure in the fluid space.

43 Claims, 18 Drawing Sheets

FLUID PRESSURE SENSOR

TECHNICAL FIELD

The present disclosure relates to a pressure sensor for measuring a fluid pressure, in particular a vacuum pressure.

BACKGROUND

Pressure sensors for measuring the pressure of a gas or liquid are widely used in many different applications. Capacitive sensors use a diaphragm and pressure cavity to create a variable capacitor to detect strain due to applied pressure, capacitance decreasing as pressure deforms the diaphragm. Common technologies use metal, ceramic, and silicon diaphragms.

Various approaches have been used to expand the measuring range of capacitive pressure sensors. For example, pressure sensors of various sensitivities have been arranged one behind the other with strain gauges. An alternative approach utilizes a capacity manometer with a diaphragm which is freely movable at low pressure and which engages a elastically deformable electrode at or near atmospheric pressure.

Dual range manometers are known which have two signal outputs which are derived from the same sensor input, but in which one output uses different amplification than the other. Other approaches have used two electrodes and two diaphragms.

Known capacitive pressure sensors have limited dynamic operating range of at most four to five decades of pressure due to physical limitations associated with the displacement of diaphragms. In many applications, in particular in the semiconductor industry, a dynamic measurement range of six to seven decades of pressure is required, e.g. to measure from atmospheric pressure of $10^3$ hPa to a vacuum pressure of $10^{-4}$ hPa. This requires the installation of two separate pressure transducers with different measurement ranges.

SUMMARY

The objective of the present disclosure is to create a sensor for absolute or differential fluid pressure which can sense over a very large operating range, in particular vacuum sensors with six to seven decades of pressure dynamic range, and with results that are reproducible and stable over the long term.

In order to attain this wide dynamic measurement range with a single pressure sensor, at least two diaphragms are simultaneously subjected to the same measuring pressure. The at least two diaphragms preferably have different geometries, in particularly surfaces or different sizes, and/or completely or partially different wall thicknesses. It is particularly advantageous to subject the respective exterior surfaces of the at least two diaphragms to a common reference vacuum.

The reference vacuum may be provided within a housing that surrounds the diaphragms and which acts as a reference pressure chamber. The reference vacuum may be maintained at a stable level by attaching a getter.

The reference vacuum may be created or maintained with an ion getter pump ("Orbitron"). A monitoring sensor (Pirani) for the reference vacuum may be provided.

The two diaphragms are preferably positioned facing one another in parallel and enclose a minimum interstitial space or measurement volume, to which the measurement pressure is applied via a small opening or a fluid supply element. When the measurement pressure is increased, the diaphragms are displaced towards measuring electrodes, thereby causing a change in capacitance which can be measured. The electrodes are connected to an external electronic measurement circuit through connecting wires which pass through hermetically sealed grommets. Optionally, electronic evaluation chips or circuits may be placed directly on the rear surface of the reference electrodes (e.g. electrode plates). A further option is the placement of heating coils on the rear surface of the electrode plates in order to accomplish thermal regulation of the entire measuring device in a simple manner.

A pressure sensor for measuring a fluid pressure hence comprises a fluid space formed between a first diaphragm and a second diaphragm. A fluid supply element connects the fluid space with an exterior opening of the pressure sensor. A first measuring electrode is arranged opposite the first diaphragm, the first diaphragm and the first measuring electrode forming a first capacitor having a first capacitance that varies with a change in position of the first diaphragm. A second measuring electrode is arranged opposite the second diaphragm, the second diaphragm and the second measuring electrode forming a second capacitor having a second capacitance that varies with a change in position of the second diaphragm. The fluid pressure in the fluid space can hence be determined by evaluating the first capacitance and the second capacitance.

A first reference electrode may be provided adjacent to the first measuring electrode and a second reference electrode may be provided adjacent to the second measuring electrode. In that case the capacitance between the first measuring electrode and the first reference electrode varies with the position of the first diaphragm, and is hence indicative of the pressure in the fluid space. Similarly, the capacitance between the second measuring electrode and the second reference electrode varies with the position of the second diaphragm, and is hence indicative of the pressure in the fluid space. The first measuring electrode and reference electrode may be wired independently from the second measuring electrode and reference electrode to an evaluation circuit. Alternatively, the first measuring electrode and reference electrode may be connected either in series or parallel with the second measuring electrode and reference electrode.

The first diaphragm and the second diaphragm may be at least partially electrically conductive. The diaphragms may for example be made from silicon (Si). Alternatively, electrically conductive electrodes may be provided on electrically insulated diaphragms.

The fluid space in the pressure sensor may be connected by a single fluid supply element that allows fluid to enter and exit the fluid space. Alternatively, the fluid space may be connected to a fluid supply element and a fluid removal element, allowing fluid to flow through the fluid space in the sensor. The fluid supply element and the fluid removal element are preferably arranged at opposite ends of the fluid space.

To achieve the desired high dynamic measurement range one of the diaphragms is preferably thinner than the other diaphragm. The diaphragms may also have different surface areas. Inherently, a diaphragm with smaller surface area is less sensitive as less force acts on the diaphragm when exposed to different pressures on both sides of the diaphragm.

In a normal state when not deflected by a pressure difference on both sides of the diaphragm the diaphragms may be flat, or pre-shaped concave towards the electrodes or pre-shaped convex away from the electrodes. The first diaphragm and the second diaphragm may be arranged substantially parallel to one another, and may be substantially disc-shaped.

The distance between the first diaphragm and the second diaphragm increases with increasing pressure in the fluid space. The diaphragms, which may also be referred to as diaphragms, may be made from a wide range of materials, e.g. made of plastic, carbon, ceramic, co-fired ceramics (LTTC or HTTC), silicon, glass or a combination thereof.

The reference electrodes may be arranged in a reference space surrounding the fluid space on electrode support elements. The electrode support elements may be made of ceramic material which is electrically insulating.

The pressure sensor may be assembled by placing components with successively larger diameter onto landing surfaces of a stepped spacer element. For example, an outer edge of the first diaphragm may rest on a first step of the stepped spacer element, and an outer edge of the second diaphragm may rest on a second step of the stepped spacer element. An outer edge of the second electrode support element may rest on a third step of the stepped spacer element.

The reference electrodes may be integrated into an inner surface of a housing surrounding the fluid space or arranged on separate electrically insulation electrode support elements. The pressure sensor may have a housing so that an interior space between the housing and the fluid space forms a reference pressure chamber. A fluid supply element may pass through the reference pressure chamber and connects the fluid space with an inlet opening in the housing. A fluid removal element may pass through the reference pressure chamber and connect the fluid space with an outlet opening in the housing. The housing may be hermetically sealed except for the inlet opening and the outlet opening. The housing may comprise a base plate and a cover plate which are arranged approximately parallel to one another. Also, the first diaphragm and the second diaphragm may be arranged substantially parallel to the base plate and the cover plate.

The pressure sensor may be assembled in a stacked or sandwiched manner. A stacked pressure sensor may be formed by placing on top of each other:
  a base plate which forms a lower wall of a housing
  a first spacer element
  a first diaphragm
  a diaphragm spacer element
  a second diaphragm
  a second spacer element
  a cover plate.

The base plate and the cover plate may be made of borosilicate glass. The first spacer element, the first diaphragm, and the diaphragm spacer element (or a portion thereof) may be integrally made of etched silicon piece. Similarly, the second spacer element, the second diaphragm, and a remaining portion of the diaphragm spacer element, if any, may be integrally made of a second etched silicon piece.

A first electrode support may be arranged between the base plate and the first spacer element and a second electrode support may be arranged between the second spacer element and the cover plate. The first electrode support and the second electrode support may be made of silicon dioxide ($SiO_2$) and may act as electromagnetic (EMC) shields. The first spacer element, the diaphragm spacer element and the second spacer element may be made of silicon (Si).

A first heating element may be arranged on the first electrode support and a second heating element may be arranged on the second electrode support.

A first reference electrode may be arranged on the first electrode support. A second reference electrode may be arranged on the second electrode support. A first diaphragm electrode arranged on the first diaphragm and a second diaphragm electrode may be arranged on the second diaphragm. An electronic evaluation circuit may be connected by wires to the reference electrodes for evaluation pressure in the fluid space. The electronic evaluation circuit may be provided inside the stacked pressure sensor between the base plate and the cover plate.

A getter arranged on the housing of the pressure sensor for stabilizing a reference pressure within the housing. Alternatively, an ion getter pump may be connected to the housing for maintaining a reference pressure within the housing. A reference pressure sensor, e.g. a Pirani sensor, may be provided for monitoring the pressure within the housing.

The maximal displacement of the first diaphragm and/or the second diaphragm may be limited by the diaphragm contacting the electrode support element, which thus acts as a stop element.

The pressure sensor may have an evacuation orifice which can be hermetically sealed.

BRIEF DESCRIPTION OF THE DRAWINGS

FIG. 6a is a cross sectional view A-A' of FIG. 6c.

FIG. 6b is a cross sectional view B-B' of FIG. 6c.

FIG. 6c is a cross sectional view C-C' of FIG. 6a.

FIG. 6d is a cross sectional view D-D' of FIG. 6a.

FIG. 7a is a cross sectional view A-A' of FIG. 7c.

FIG. 7b is a cross sectional view B-B' of FIG. 7c.

FIG. 7c is a cross sectional view C-C' of FIG. 7a.

FIG. 7d is a cross sectional view D-D' of FIG. 7a.

FIG. 8a is a cross sectional view A-A' of FIG. 8c.

FIG. 8b is a cross sectional view B-B' of FIG. 8c.

FIG. 8c is a cross sectional view C-C' of FIG. 8a.

FIG. 8d is a cross sectional view D-D' of FIG. 8a.

DETAILED DESCRIPTION

Figure 1:
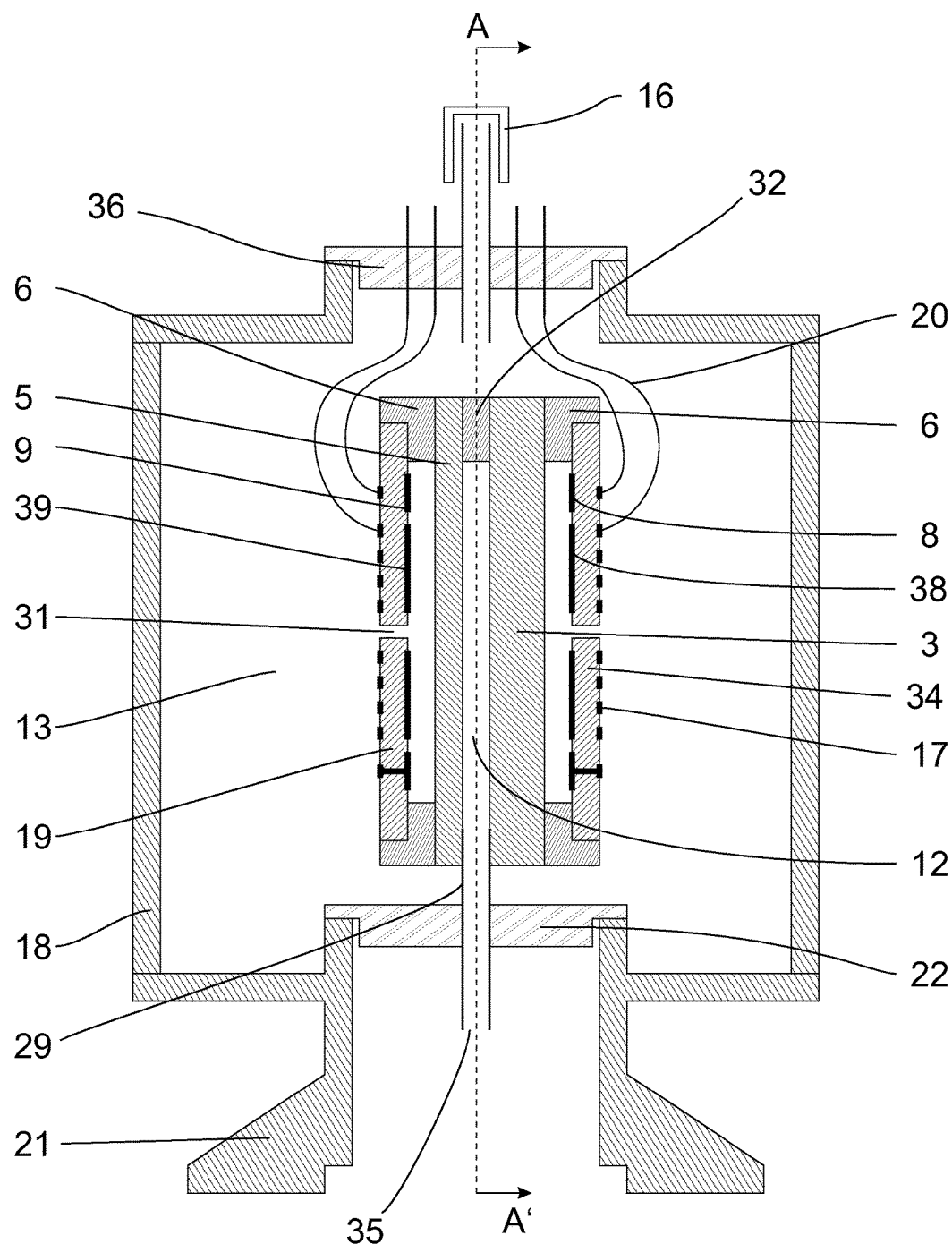
FIG. 1 is a cross sectional view of a first exemplary pressure sensor.
Figure 2:
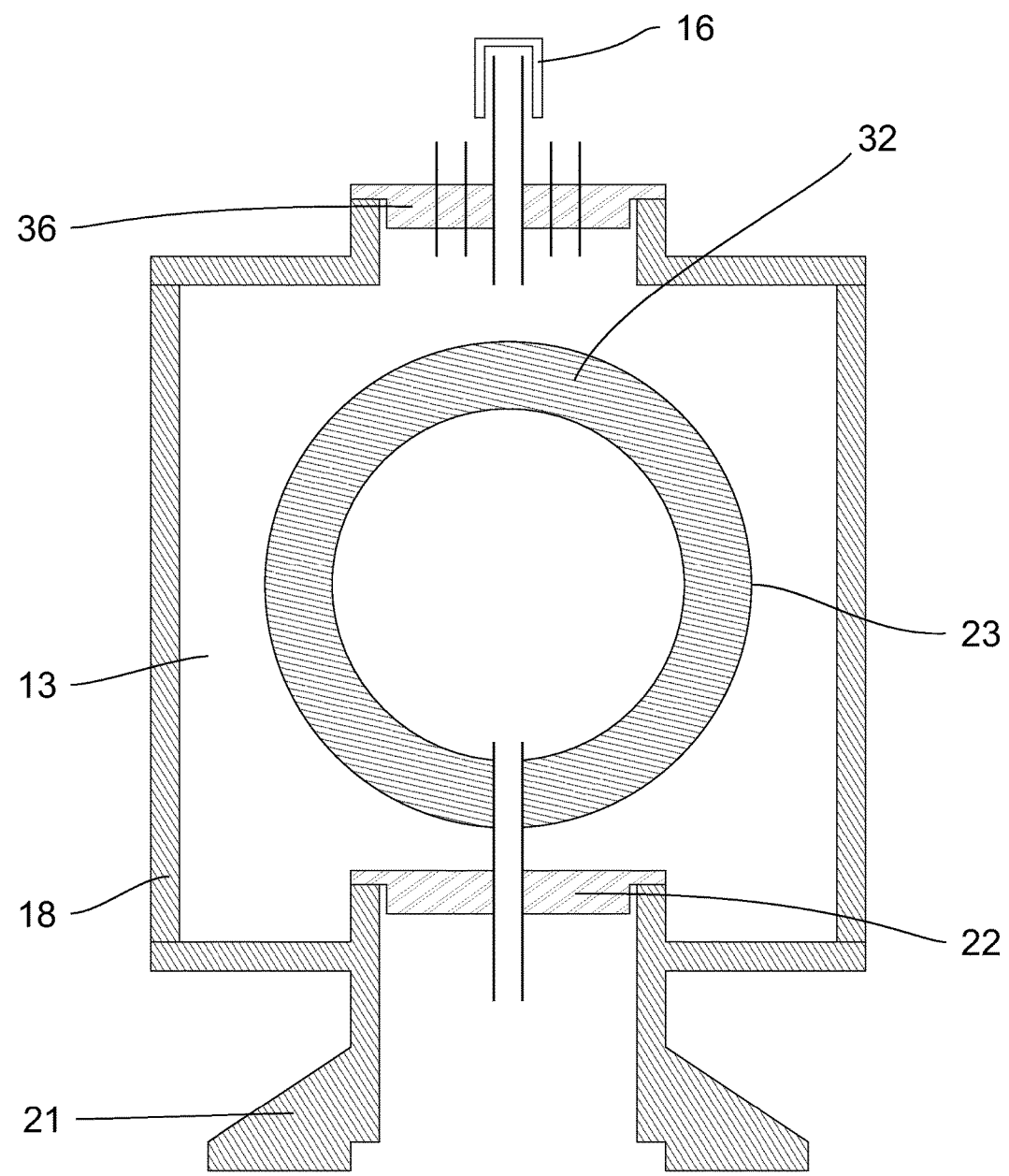
FIG. 2 is a perpendicular cross sectional view A-A' of the pressure sensor as in FIG. 1.

FIG. 1 and FIG. 2 depict vertical cross sectional views through an exemplary pressure sensor, the view in FIG. 2 being perpendicular to the view in FIG. 1 as indicated by the line A-A in FIG. 1. The sensor comprises a small measurement or fluid space 12. The fluid space 12 is bounded by a first diaphragm 3 and a second diaphragm 5. The diaphragms 3, 5 may be approximately disk-shaped with diaphragm edges 23 having a rounded shape. The first diaphragm 3 and the second diaphragm 5 are preferably of different thickness. As shown, the second diaphragm 5 may be thinner than the first diaphragm 3. The diaphragms 3, 5 may be electrically conductive.

The fluid space 12 is connected to a vacuum flange 21 by a fluid supply element 29 which passes through an opening of a TO header 22. The fluid supply element 29 allows fluid, the pressure of which is to be sensed, to enter and exit the fluid space 12. The outer end of the fluid supply element 29 is an external opening 35 of the pressure sensor. The TO header 22 secures and seals the fluid supply element 29. The fluid space 12 may be arranged perpendicular to the attachment surface of vacuum flange 21.

Electrically insulated electrode supports 19, 34 are provided preferably in the form of ceramic plates, and are arranged approximately parallel to each of the diaphragms 3, 5. At least two measuring electrodes 38, 39 are provided. A first measuring electrode 38 is located on the side of the first electrode support 34 which faces the first diaphragm 3. A second measuring electrode 39 is located on the side of the second electrode support 19 which faces the second diaphragm 5.

The first measuring electrode 38 and the first diaphragm 3 arranged opposite thereof form a first capacitor having a first capacitance that varies with a change in position of the first diaphragm 3. The second measuring electrode 39 and the second diaphragm 5 form a second capacitor having a second capacitance that varies with a change in position of the second diaphragm 5. The first diaphragm 3 and the second diaphragm 5 may be electrically conductively connected by a diaphragm spacer element 32. Pressure variation in the fluid space 12 causes the distance between the diaphragms 3, 5 and the respective measuring electrodes 38, 39 to vary, which causes a variation in the respective capacitance of the first capacitor and the second capacitor. The variation of capacitance can be measured by an evaluation circuit (not shown) that is operatively connected to the measuring electrodes 38, 39.

A first reference electrode 8 may be provided proximal to the first measuring electrode 38 on the first electrode support 34. A second reference electrode 9 may be provided proximal to the second measuring electrode 39 on the second electrode support 19. The evaluation circuit may be connected to the measuring electrodes 38, 39 and the respective reference electrodes 8, 9 to detect the pressure-dependent capacitance between the first measuring electrode 38 and the first reference electrode 8 and the pressure-dependent capacitance between the second measuring electrode 39 and the second reference electrode 9 and based thereon determine the fluid pressure in the fluid space 12.

The first diaphragm 3 and the second diaphragm 5 are connected to each other at a fixed distance and in a hermetically sealed manner by a diaphragm spacer element 32 that is arranged along their edges 23. Opposite the diaphragm spacer element 32 the two diaphragms 3, 5 and the two electrode supports 19, 34 are firmly connected to each other at fixed distances by spacer plates 6.

The subassembly comprising the electrode supports 19, 34 and the diaphragms 3, 5 is enclosed by a housing with a housing wall 18 which encompasses a reference space 13 in which a desired constant reference pressure or vacuum reference can be set.

Equalization orifices 31 are provided in the electrode supports 19, 34 to equalize the pressure between the reference space 13 and the space between the electrode supports 19, 34 and the diaphragms 3, 5. If the measurement pressure in the fluid space 12 is greater than the pressure in the reference space 13, the thinner second diaphragm 5 is first displaced in the direction of the second electrode support 19 adjacent thereto even when the pressure differential is low. If the measurement pressure in the fluid space 12 increases further, the thicker first diaphragm 3 is displaced in the direction of the first electrode support 34 which is adjacent to the first diaphragm 3. If the measurement pressure continues to increase, the second diaphragm 5 may touch the second electrode support 19 and be supported by it. The second electrode support 19 in that case acts as a stop element that limits the maximal displacement of the second diaphragm 5.

The first diaphragm 3 and/or the second diaphragm 5 may be a substantially flat when in a normal position when the pressure in the reference space 13 equals the pressure in the fluid space 12. Alternatively, the first diaphragm 3 and/or the second diaphragm 5 may be a substantially concave (bent towards the adjacent electrode support) or convex (bent away from the adjacent electrode support) when in a normal position when the pressure in the reference space 13 equals the pressure in the fluid space 12. In an overlapping measurement pressure range, both diaphragms 3, 5 may be displaced without touching their associated electrode support 19, 34.

The electrode supports 19, 34 and/or the spacer plates 6 may advantageously be configured so as to provide an electromagnetic shielding effect.

The reference pressure in the reference space 13 may adjusted by means of a closable opening in the housing 18 which may be a reference space valve 16 or any other form of sealable opening known in the art. This opening may be provided e.g. in a second TO header 36 integrated into the housing 18. Connecting wires 20 may be routed through this second TO header 36 to supply electric current to heating elements of a heater 17. Elements of the heater 17 may be arranged on the electrode supports 19, 34.

Figure 3:
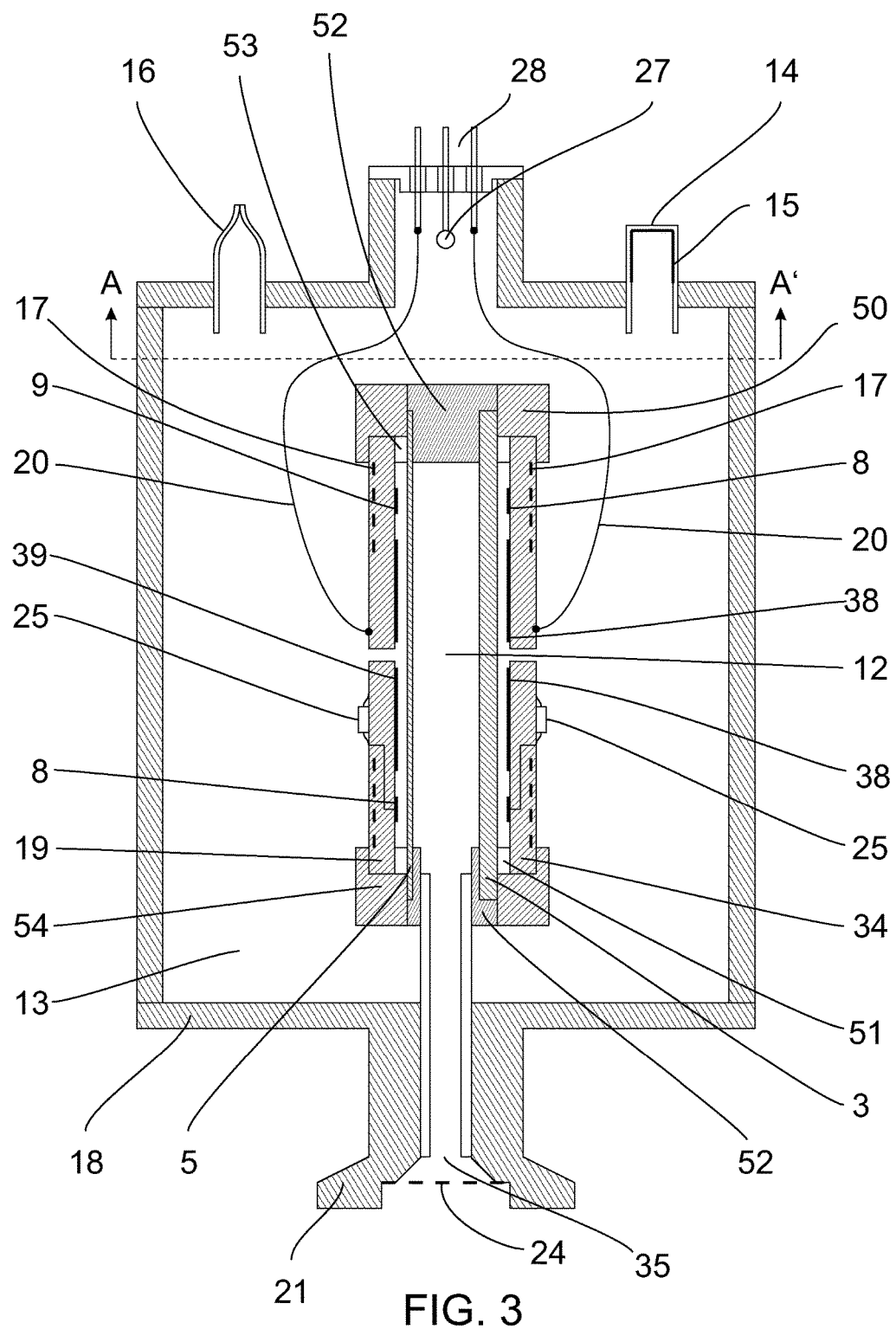
FIG. 3 is a cross sectional view of a second exemplary pressure sensor.
Figure 3A:
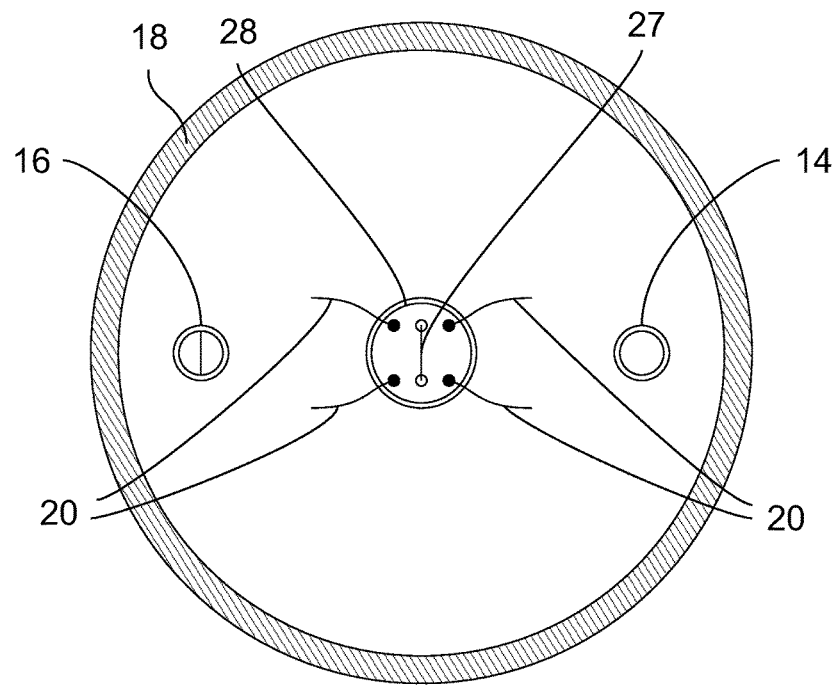
FIG. 3a is first alternative a cross sectional view A-A' of the pressure sensor as in FIG. 3.
Figure 3B:
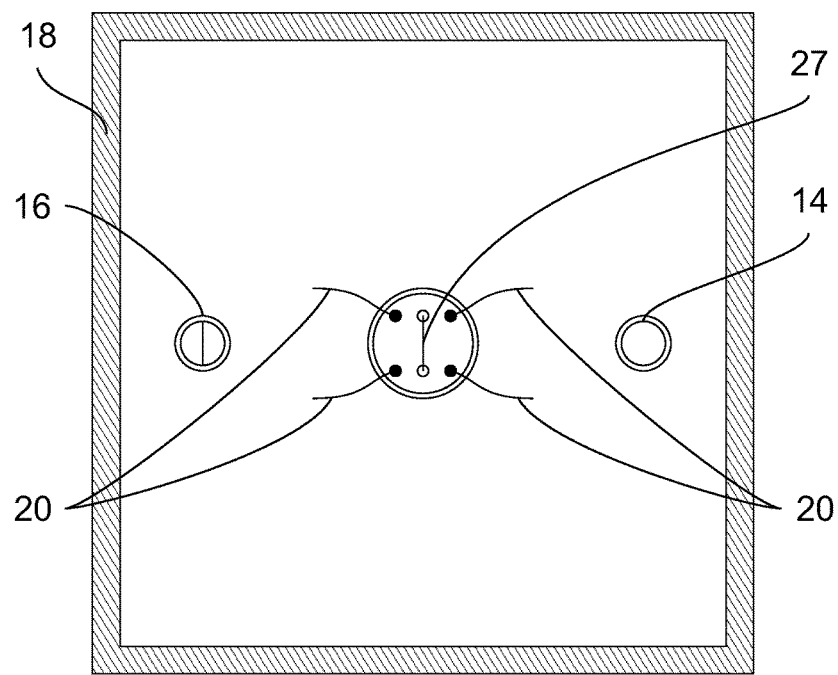
FIG. 3b is second alternative a cross sectional view A-A' of the pressure sensor as in FIG. 3.

FIG. 3 illustrates an alternative exemplary embodiment of a pressure sensor with additional features. The pressure sensor may have a generally cylindrical housing 18 as illustrated in FIG. 3a, showing a cross-sectional view A-A' of FIG. 3. The pressure sensor may alternatively have a generally box-shaped housing 18 as illustrated in FIG. 3b, showing an alternative cross sectional view A-A' of FIG. 3.

A first measuring electrode 38 and a first reference electrode 8 are provided on a first electrode support 34. The first electrode support 34 rests on a first step of a first stepped mount 50. Arranged substantially in parallel to the first electrode support 34 is a first diaphragm 3, which rests on a second stop of the first stepped mount 50. A spacer ring 51 is arranged between the first diaphragm 3 and the first electrode support 34 to securely hold the first electrode support 34 in place. The arrangement is mirrored on an opposite side with a second stepped mount 54 and a second spacer ring 53 holding the second electrode support 19 and the second diaphragm 5. A stepped diaphragm spacer 52 is arranged between the first stepped mount 50 and the second stepped mount 54.

The inner diameter of the spacer rings 51, 53 affects the saturation pressure at which the associated diaphragm 3, 5 is bent through and comes to touch the adjacent electrode support 19, 34. Various models of the pressure sensor with different measurement characteristics can thus be built simply be changing the inner diameter of the spacer rings 51, 53 without changing any other components. All else being equal the following rule applies: The smaller the inner diameter of a spacer ring, the larger the saturation pressure that is needed to deflect the associated diaphragm 3, 5 to touch the adjacent electrode support 19, 34.

A particle filter 24 may be provided in the vacuum flange 21 in front of the fluid intake opening 35 to prevent contaminants from entering the fluid space 12. Optional electronic evaluation units 25 may be arranged inside the housing 18 and may be connected with the measuring electrodes 38, 39 and reference electrodes 8, 9 by vias 43 in the ceramic electrode supports 19, 34. The signals from the measuring electrodes 38, 39 or respectively from the electronic evaluation units 25 are conducted via input leads or connecting wires 20 to hermetically sealed pins of connector 28 for an electronic control unit located outside the housing.

An optional Pirani sensor 27 for monitoring pressure in the reference space 13 may be provided and operatively connected through connector 28.

A getter 15 held in a getter mount 14 may optionally be provided and integrated into the housing wall 18. An evacuation connection or valve 16 for the reference space 13 may also be arranged in the housing wall 18.

Figure 3C:
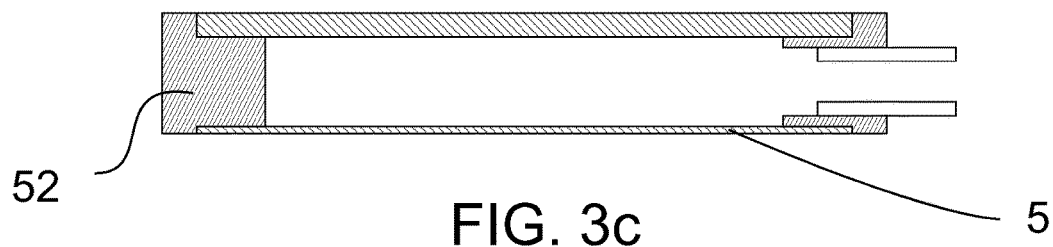
FIG. 3c-FIG. 3f show alternative cross sectional shapes of a diaphragm.
Figure 3D:
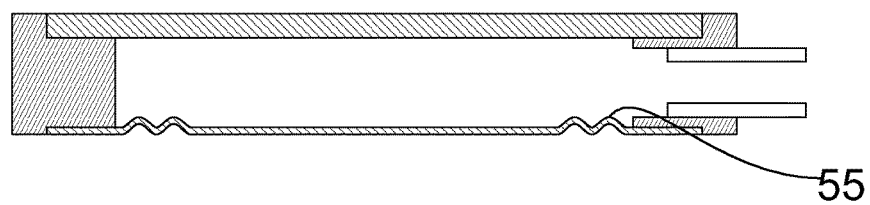
Figure 3E:
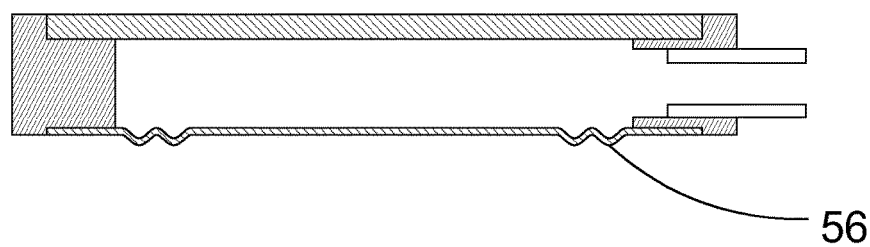
Figure 3F:
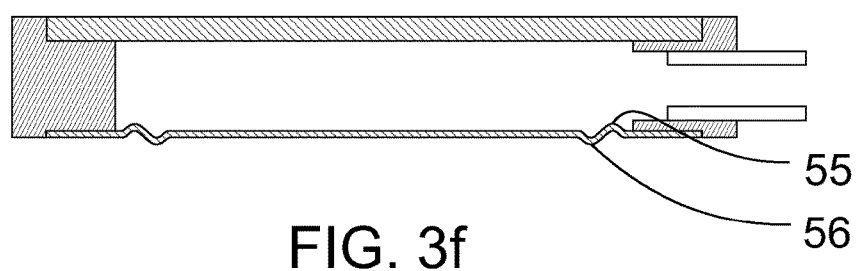

As shown in FIG. 3c, the second diaphragm 5 may be substantially flat when not exposed to any differential pressure. Alternatively, the second diaphragm 5 may comprise one or more inwardly projecting annular corrugations 55 as shown in FIG. 3d. The second diaphragm 5 may comprise one or more outwardly projecting annular corrugations 56 as shown in FIG. 3e. The second diaphragm 5 may comprise both one or more inwardly projecting annular corrugations 55 and one or more outwardly projecting corrugations 56 as shown in FIG. 3f. The number, position and dimensions of the corrugations may be selected so as to achieve a desirable deformation of the second diaphragm 5 in the presence of differential pressure.

Figure 4:
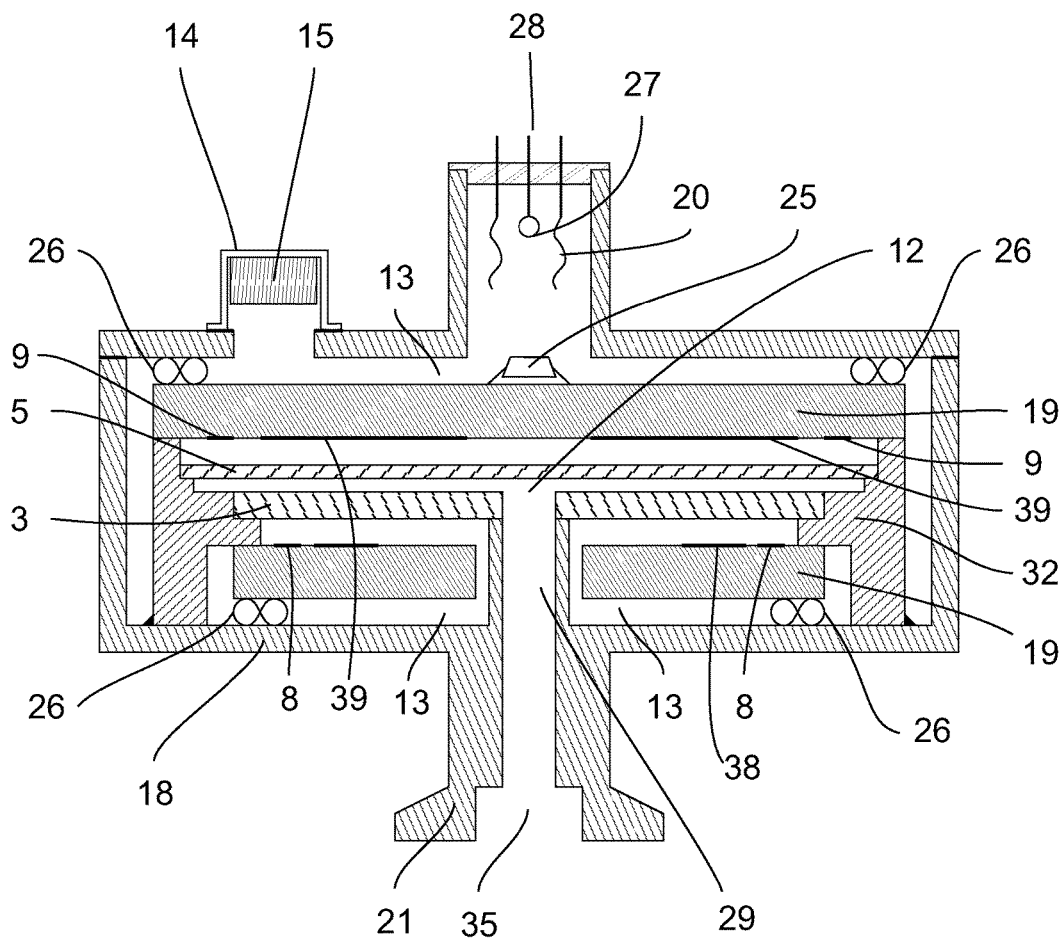
FIG. 4 is a cross sectional view of a third exemplary pressure sensor in a compact form factor.

FIG. 4 depicts an exemplary embodiment of a pressure sensor in a compact form factor. A very low component height is achieved due to the arrangement of the diaphragms 3, 5 in parallel to the flange surface. Stepped, staircase-like support surfaces on the stepped spacer element 32 simplify the installation of the first diaphragm 3 and the second diaphragm 5 with the necessary fixed distance to one another. The first diaphragm 3 and/or the second diaphragm 5 may be an annular, disc-shaped, diaphragm. As illustrated, the second diaphragm 5 has a larger surface area than the first diaphragm 3. The stepped spacer element 32 is fixed permanently to the chalice-shaped lower portion of the housing 18, e.g. by welding, brazing, or gluing. The first ceramic electrode support 34 adjoining the flange 21 has on opening, preferably located centrally, for passing through the fluid supply element 29 to first diaphragms 3. The ceramic electrode support elements 19, 34 provides surfaces to which the measuring electrodes 38, 39 are attached. The outer edge distances between the two ceramic support components 19, 34 and the corresponding diaphragms 3, 5 are determined by the step heights between landing surfaces of the stepped spacer element 32. The two ceramic support components 19, 34 may be clamped in place between the wall of the housing 18 and the aforementioned landing surfaces by spring-loaded clamping elements 26. All cavities located between the ceramic support elements 19, 34 and the interior surfaces of the housing are preferable connected with one another, and jointly form the reference space 13.

Figure 5:
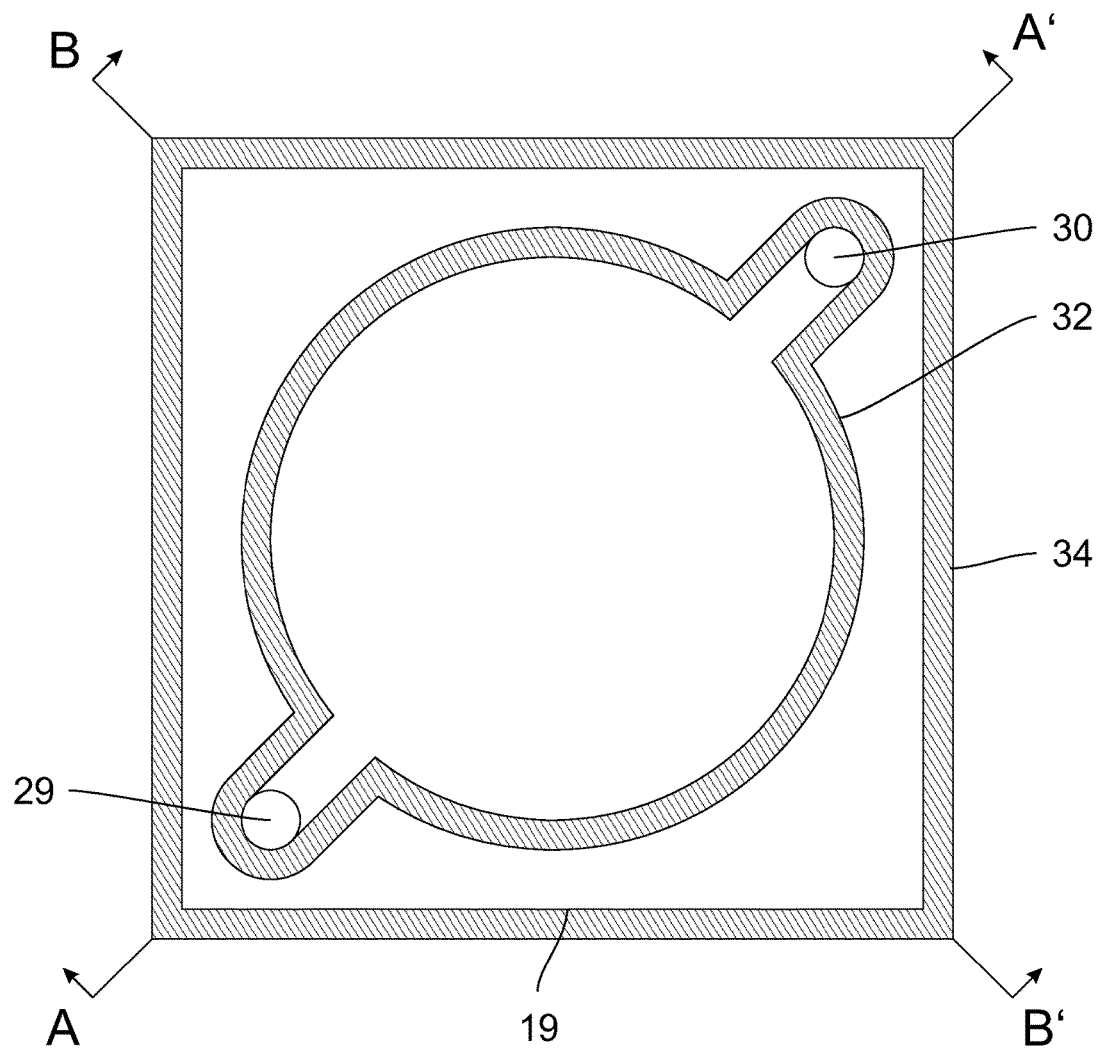
FIG. 5 is a cross sectional view of a fourth pressure sensor.
Figure 5A:
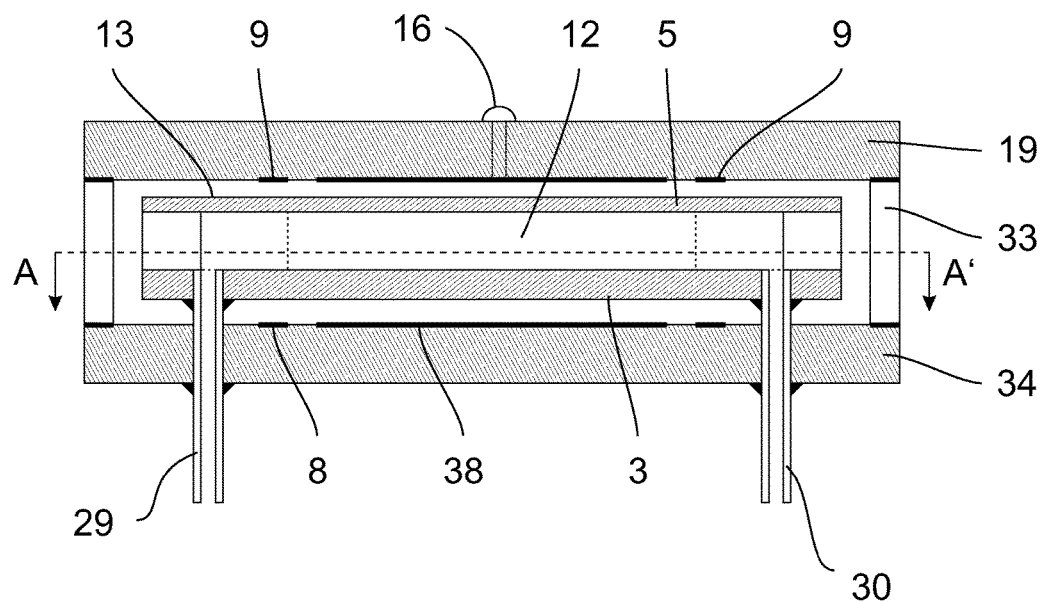
FIG. 5a is a cross sectional view A-A' of FIG. 5.
Figure 5B:
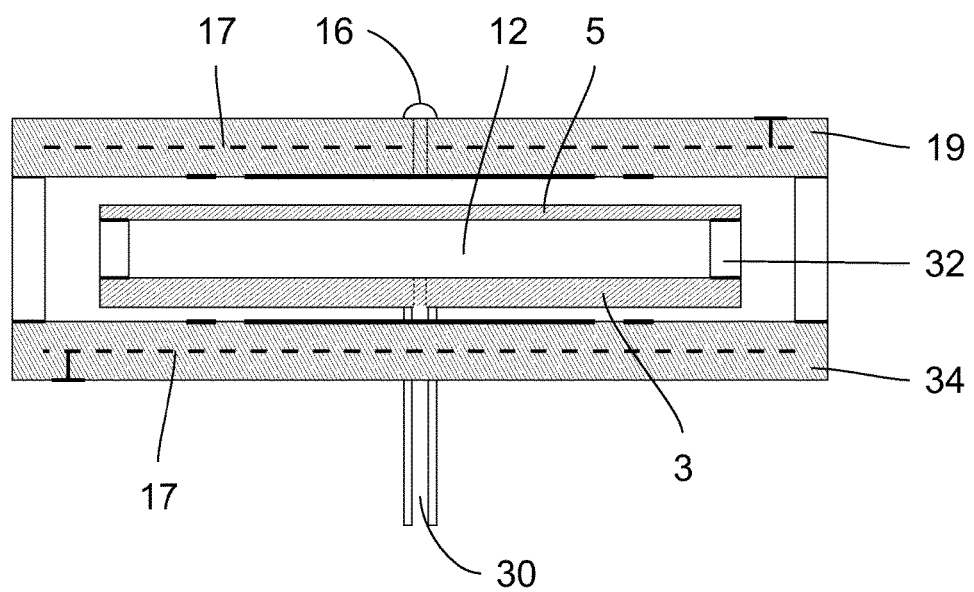
FIG. 5b is a cross sectional view B-B' of FIG. 5.

An alternative pressure sensor with a fluid supply element 29 and a fluid removal element 30 is shown in FIGS. 5, 5a and 5b. FIG. 5a shows a cross section A-A' of FIG. 5; FIG. 5b shows a cross section B-B' of FIG. 5. The pressure sensor as depicted in FIG. 5, FIG. 5a and FIG. 5b can be used to measure absolute pressure, flow pressure, and differential pressure. The flat, somewhat can-like housing shape is formed by two ceramic support plates 19, 34 of any shape that are arranged parallel and at a distance to one another. The ceramic support plates 19, 34 are connected to one another at their edges by suitable side walls 33 in a hermetically sealed arrangement. Two diaphragms 3, 5 of different thicknesses are also arranged in parallel and at a distance to one another with their edged being connected in a hermetically sealed manner by a diaphragm spacer element 32.

A tubular fluid inlet element 29 and a tubular fluid outlet element 30 may be provided and operatively connected in sealed connections on opposite ends of the fluid space 12. The tubular elements 29, 30 are reaching through the first ceramic support plate 34 and are attached so tightly to the first ceramic support element 34 that the tubes also serve as spacers for adjusting the distance between the diaphragms 3, 5 and the measuring electrodes 38, 39 which arranged on the ceramic support elements 19, 34.

Heating elements of the heater 17 may be integrated into the one-part or multi-part ceramic support elements 19, 34.

Figure 6A:
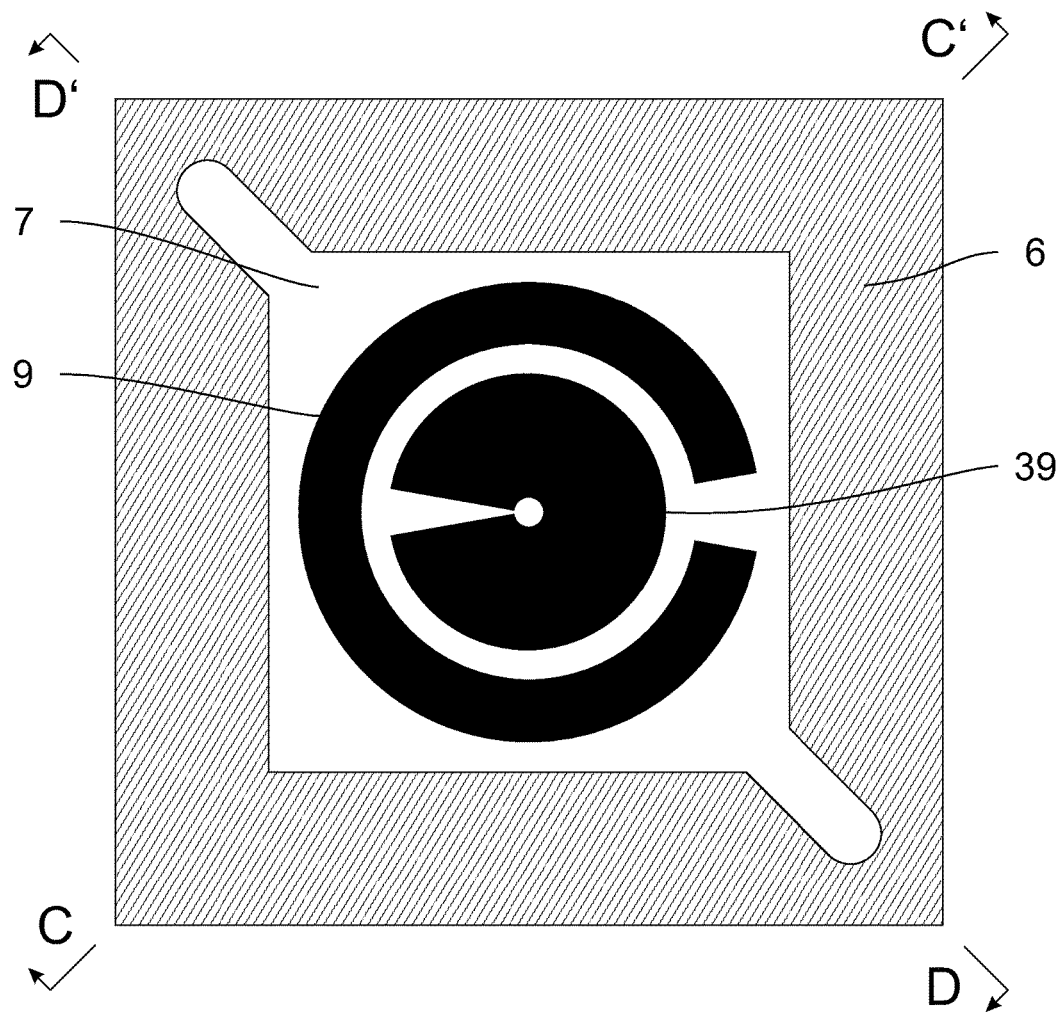
FIG. 6a-6d are cross sectional views of a fifth exemplary pressure sensor.
Figure 6B:
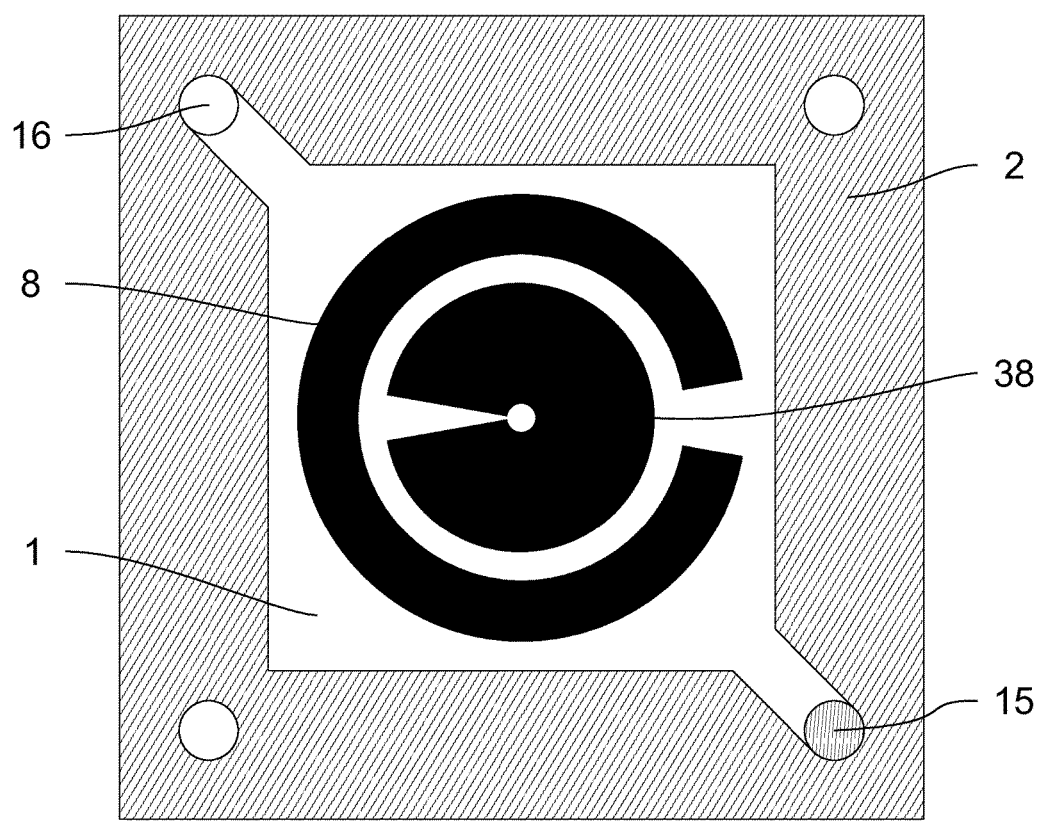
Figure 6C:
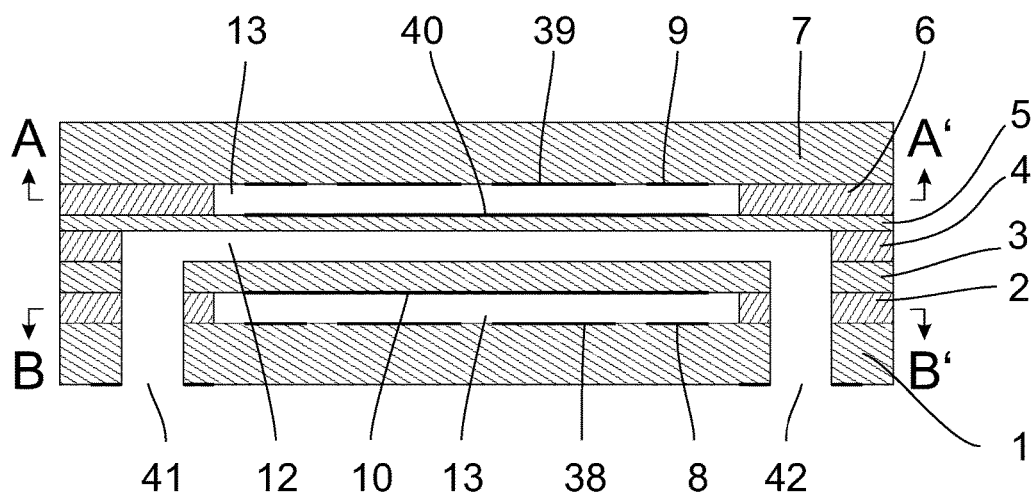

An alternative pressure sensor can be formed exclusively of substantially planar materials stacked one on top of another as shown in FIGS. 6a-6d. The sectional view of FIG. 6c shows the structure of such a pressure sensor. A base plate 1 is provided at the bottom of the sensor. The base plate 1 may be made of ceramic material and fitted with a first measuring electrode 38 and a first reference electrode 8. Above that, a spacer plate 2 and a thick first diaphragm 3 are provided. In the area of the first diaphragm 3, the spacer plate 2 has a large e.g. circular cutout in order to form a lower reference space 13 into which the first diaphragm 3 can move under increased pressure in the fluid space 12.

In order to form a suitable measurement space or fluid space 12, the first diaphragm 3 is positioned at a distance to the second diaphragm 5 by means of an additional diaphragm spacer plate 4. The connection of the fluid space 12 with the fluid to be measured is provided by e.g. circular openings in the base plate 1, the spacer plate 2, the first diaphragm 3, and the diaphragm spacer plate 4. The second diaphragm 5 is fitted on the diaphragm spacer plate 4 and is in turn separated by a recessed spacer plate 6 from the cover plate 7 that covers the entire assembly. The interstitial space formed by the recess forms an upper reference space 13.

A first measuring electrode 38 and a first reference electrode 8 are provided on the base plate 1. A first diaphragm electrode 10 is provided on the first diaphragm 3 facing the first measuring electrode 38 and the first reference electrode 8.

A second measuring electrode 39 and a second reference electrode 9 are provided on the cover plate 7. A second diaphragm electrode 40 is provided on the second diaphragm 5 facing the second measuring electrode 39 and the second reference electrode 9. A relative pressure difference between the fluid space 12 and the reference space 13 causes the first diaphragm 3 and with it the first diaphragm electrode 10 to move relative to the first measuring electrode 38 and the first reference electrode 8. The movement of the first diaphragm electrode 10 can be detected by measuring the capacitance between the first measuring electrode 38 and the first reference electrode 8. Similarly, the pressure difference between the fluid space 12 and the reference space 13 causes the second diaphragm 5 and with it the second diaphragm electrode 40 to move relative to the second measuring electrode 39 and the second reference electrode 9. The movement of the second diaphragm electrode 40 can be detected by measuring the capacitance between the second measuring electrode 39 and the second reference electrode 9.

Figure 6D:
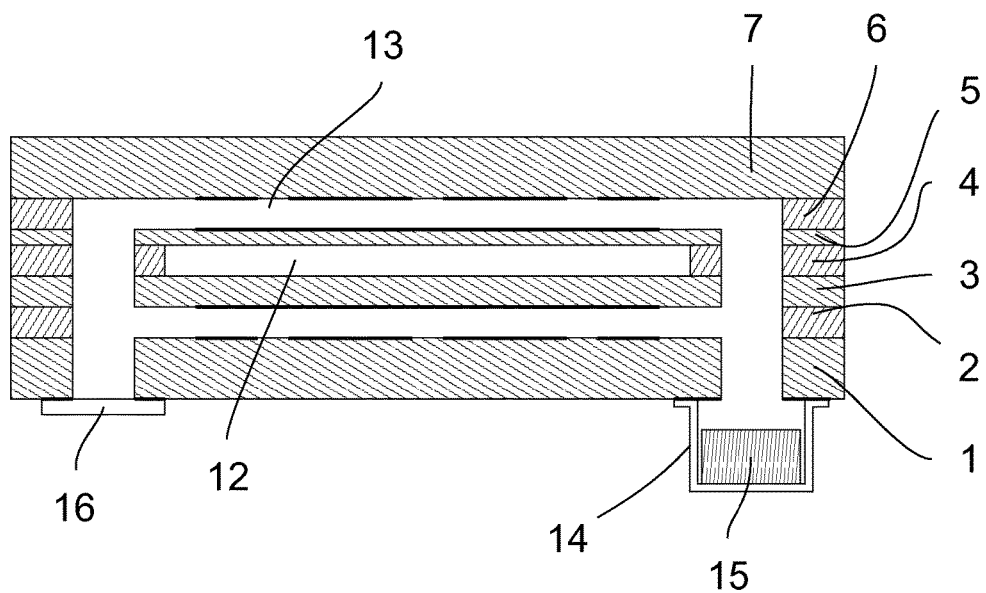

As shown in FIG. 6d, the upper and the lower portion of the reference space 13 are connected to one another at two approximately opposing sides, and are each accessible from outside through two openings 41, 42. One of the openings is optionally provided with a getter 15 by means of a getter mount 14, while the other can be hermetically sealed with a valve 16 or a seal.

Referring to FIG. 6b, the first measuring electrode 38 and the first reference electrode 8 are shown in more detail. The first measuring electrode 38 may be shaped as a circle, a circular ring, or as a sector of a circular ring. The first reference electrode 8 may be shaped as a circular ring or a sector of a circular ring and may be arranged concentrically around the first measuring electrode 38. As shown in FIG. 6a, the second measuring electrode 39 and the second reference electrode 9 may be arranged in an equivalent arrangement.

Figure 7A:
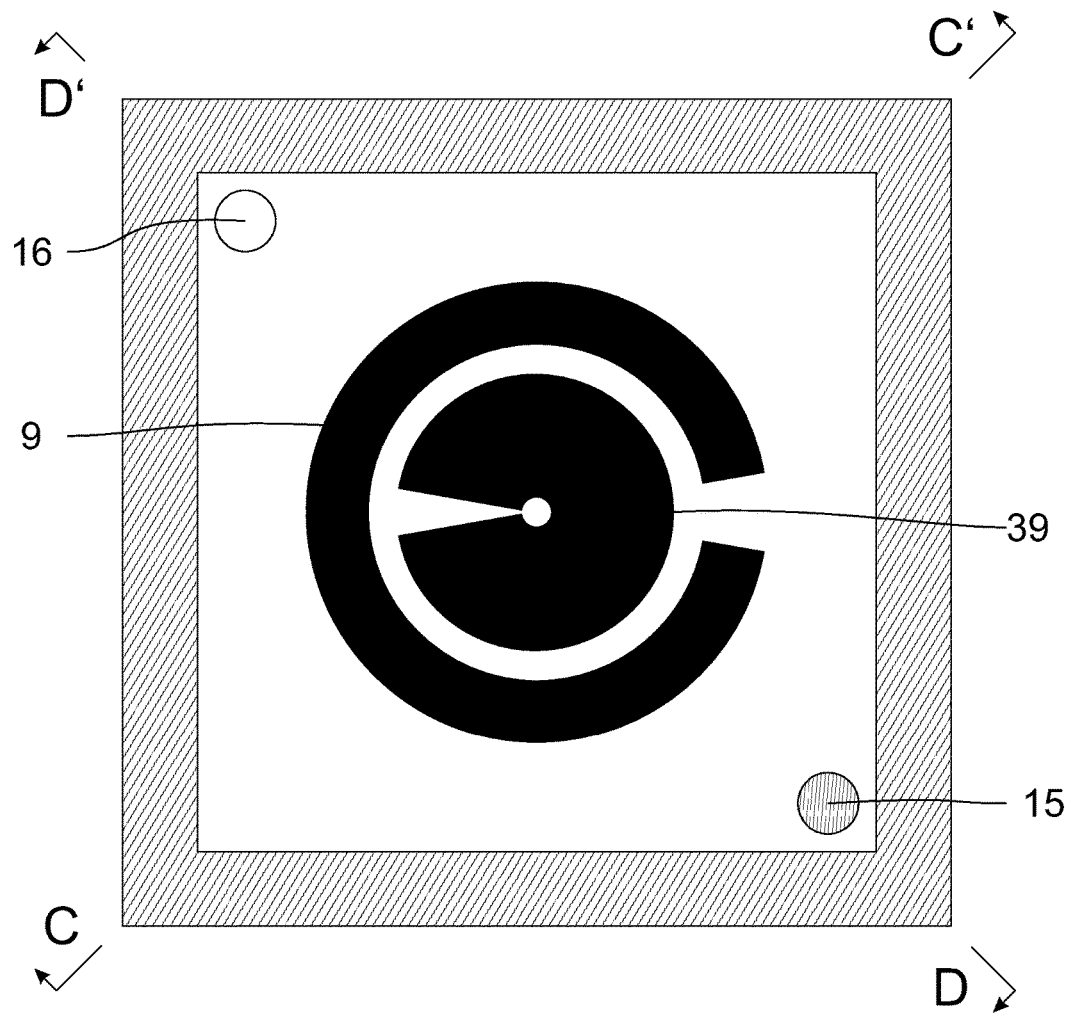
FIG. 7a-7d are cross sectional views of a sixths exemplary pressure sensor.
Figure 7B:
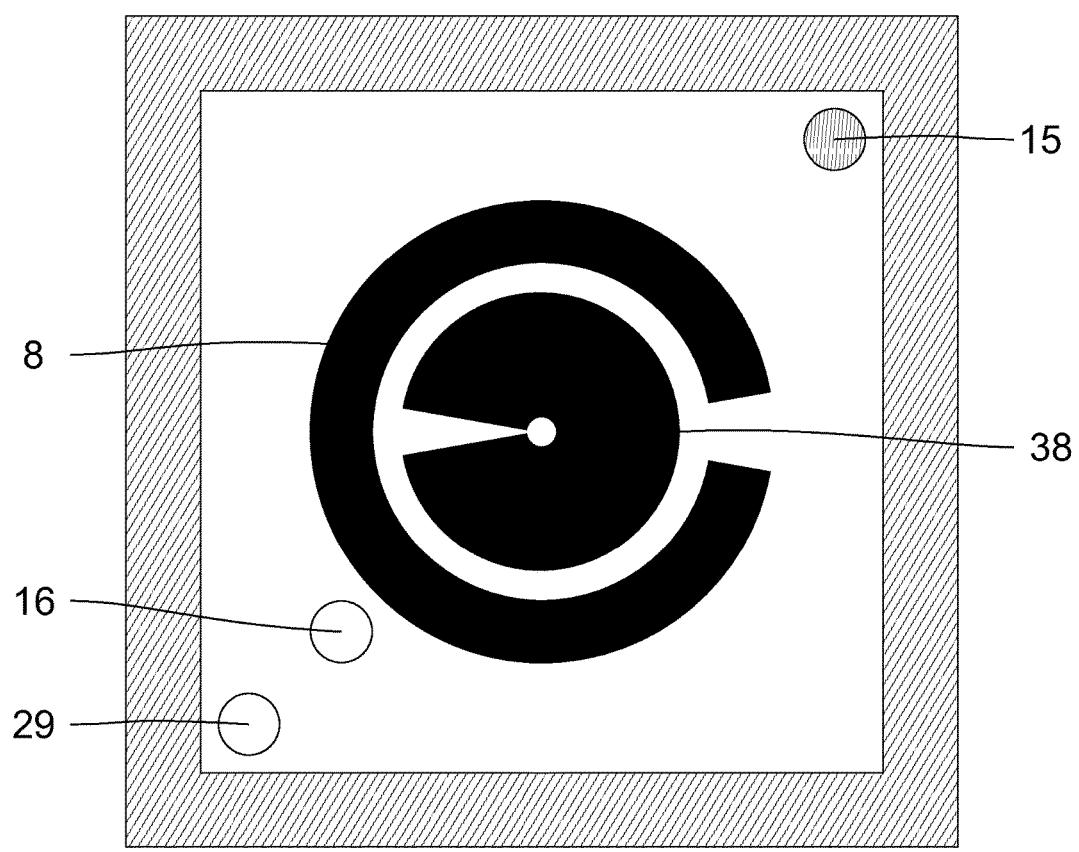
Figure 7C:
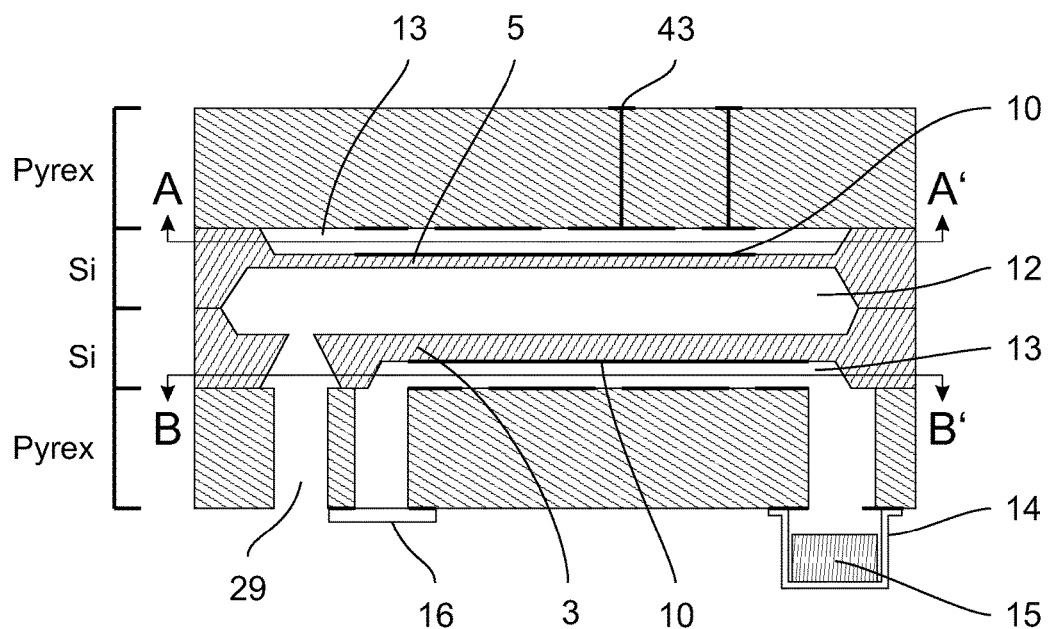
Figure 7D:
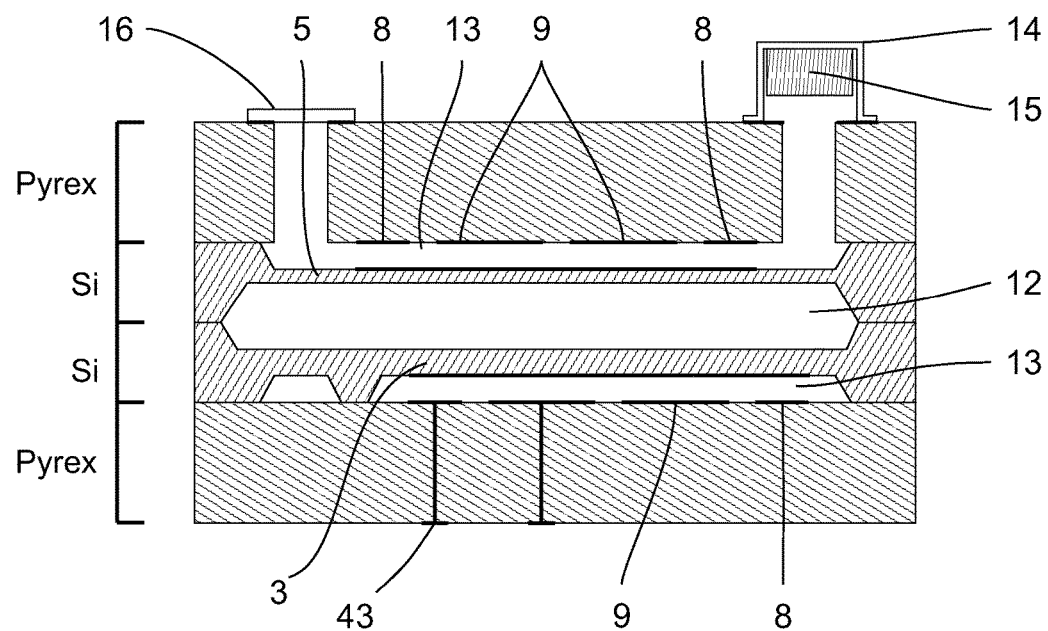
Figure 8A:
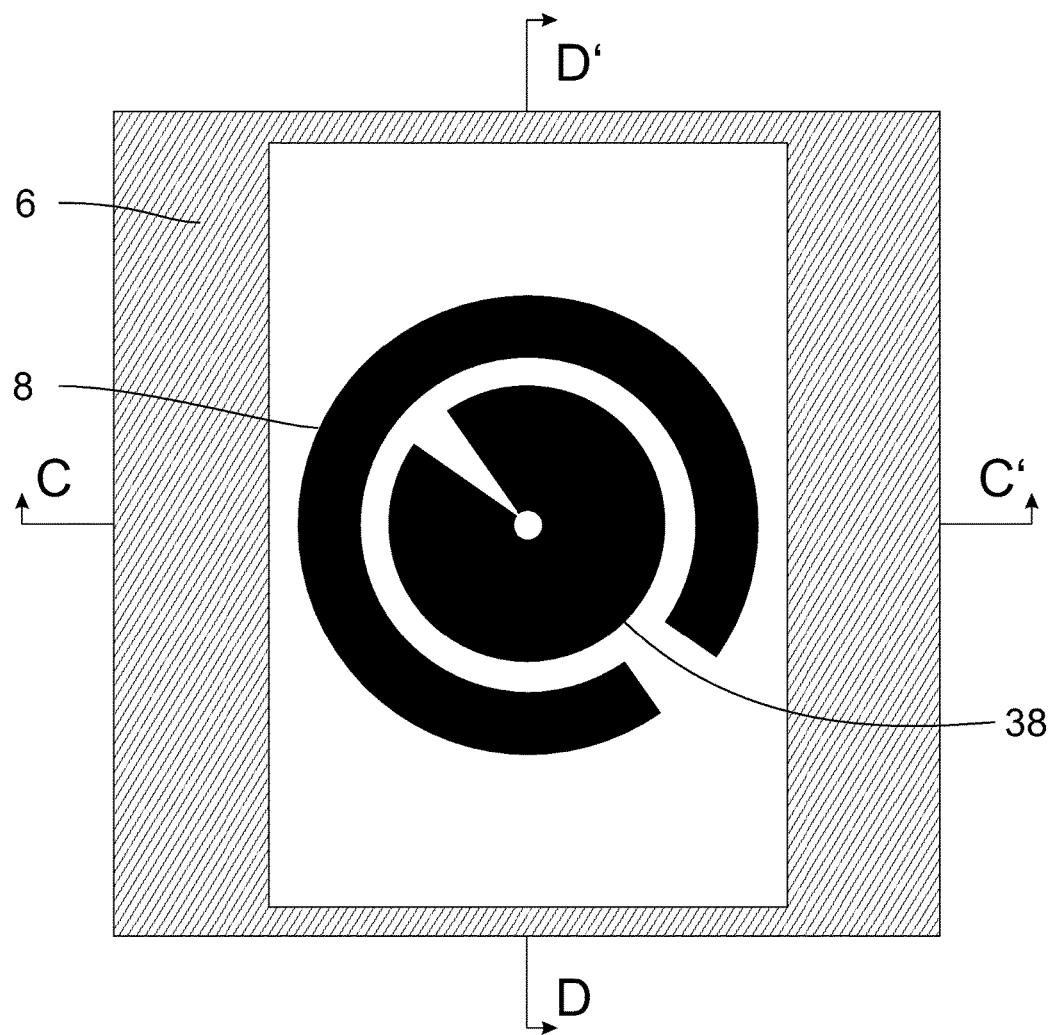
FIG. 8a-8d are cross sectional views of a seventh exemplary pressure sensor.
Figure 8B:
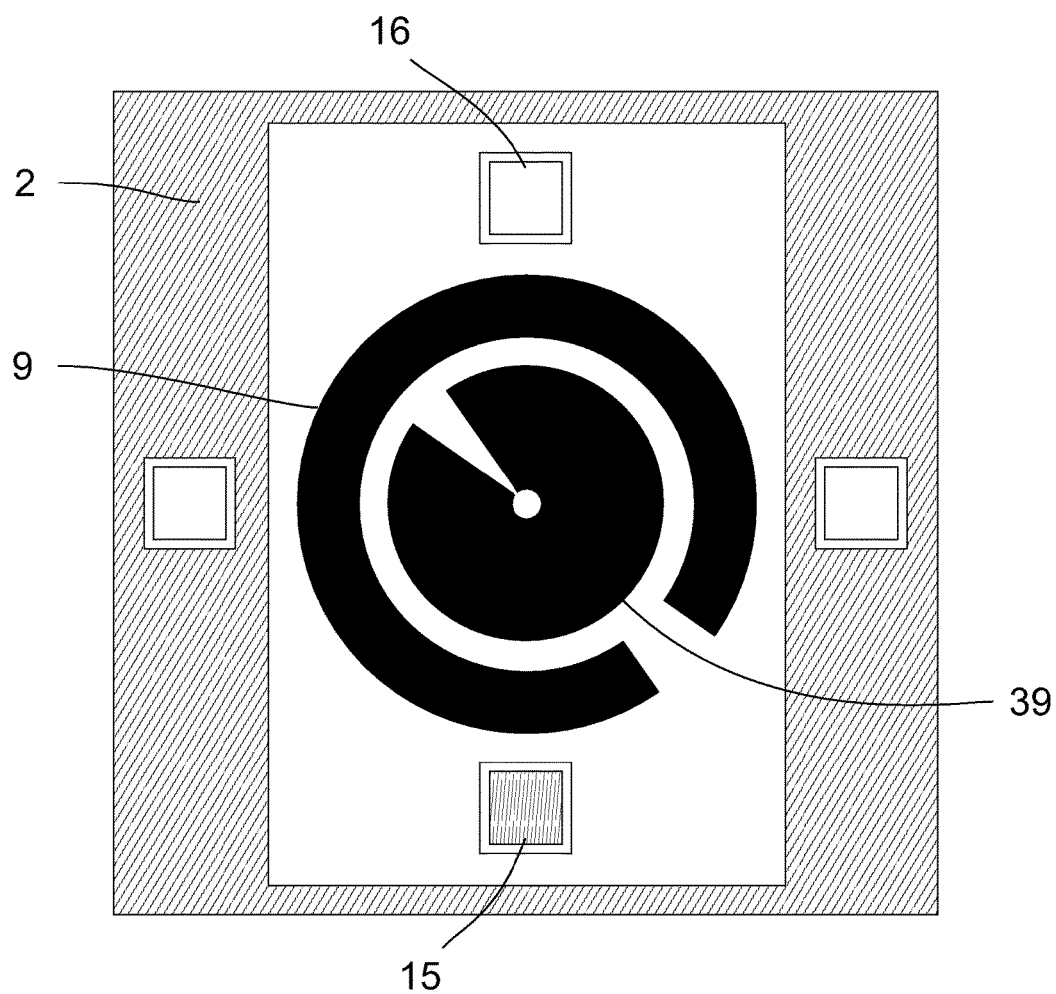
Figure 8C:
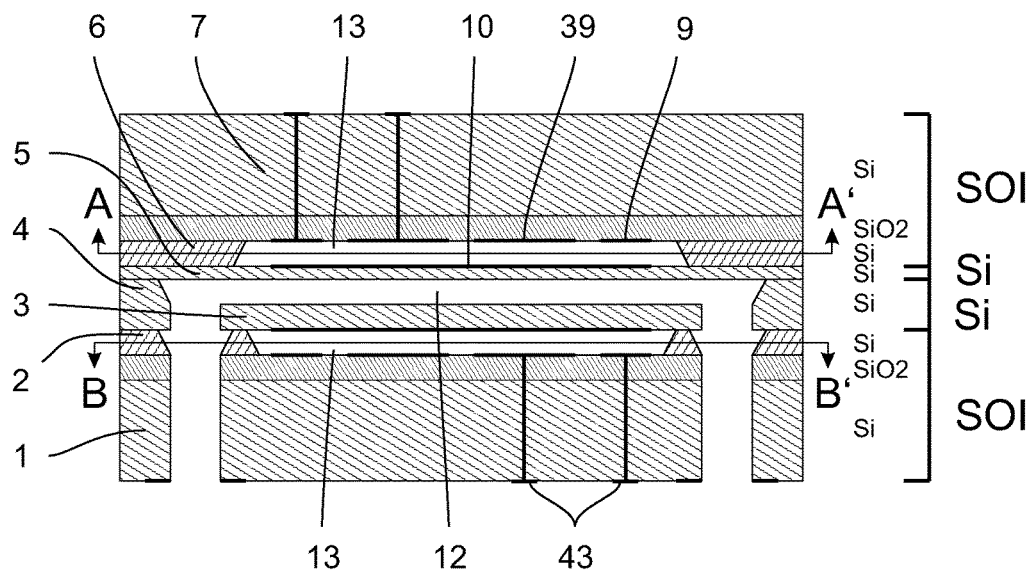
Figure 8D:
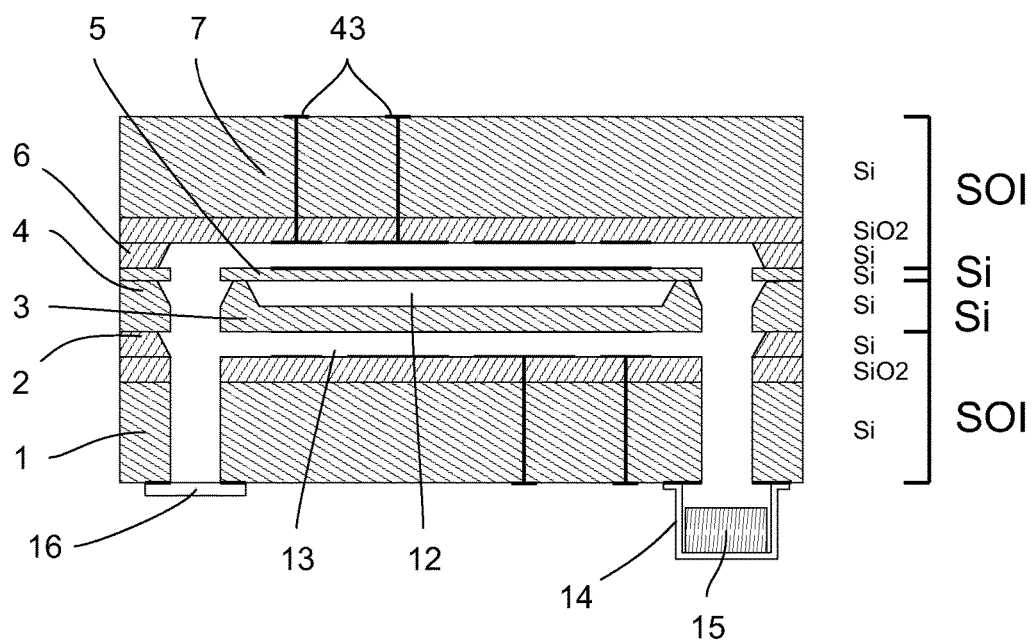

Further alternative small-format embodiments of pressure sensors are shown in FIGS. 7a-d and FIGS. 8, 8a, and 8b. The exemplary embodiments shown in FIG. 7, 7a, 7b and FIGS. 8, 8a, and 8b use differently etched layers compared to the pressure sensor shown in FIGS. 6, 6a, and 6b. As shown in FIGS. 7, 7a and 7b all connection openings may be arranged on one side of the pressure sensor. As shown in FIGS. 8, 8a and 8b the openings may be provided on opposing surfaces of the pressure sensor.

As shown in FIG. 7a and FIG. 7b the base plate 1 and the cover plate 7 of the pressure sensor may be made of borosilicate glass known as Pyrex. The electrically conductive diaphragms 3, 5 may be formed integrally with spacer elements from silicon. The coefficient of thermal expansion of borosilicate glass is similar to the coefficient of thermal expansion of silicon, such that the pressure as in FIG. 7 in which silicon layers are sandwiched between layers of borosilicate glass is minimally affected by temperature induced stress. The base plate 1 may be connected to the first diaphragm 3 by anodic bonding. Also, the cover plate 7 may be connected to the second diaphragm 5 by anodic bonding. Vias 43 may be provided in the cover plate 7 to provide an electrical connection to the measuring electrodes 38, 39 and the reference electrode 8, 9. A first diaphragm electrode 10 may be provided on the first diaphragm 3, an in particular on the side of the first diaphragm 3 that faces the first measuring electrode 8. A second diaphragm electrode 40 may be provided on the second diaphragm 5 and in particular on the side of the second diaphragm 5 that faces the second measuring electrode 9.

As shown in FIG. 8a and FIG. 8b the pressure sensor may alternatively be made almost entirely from etched silicon (Si), with only the electrode support elements made from insulating silicon dioxide ($SiO_2$). Preferably, the pressure sensor may be made by sandwiching silicon wafer components between silicon on insulator wafer components. In particular, the base plate 1 and the spacer plate 2 may be formed from a first silicon on insulator wafer. The cover plate 7 and its associated spacer plate 6 may be made from a second silicon on insulator wafer. The use of silicon on insulator wafers allows a very precise height of the spacer plates 2, 6 to be preconfigured and not subjected to variation of an anisotropic etching process.

Figure 9A:
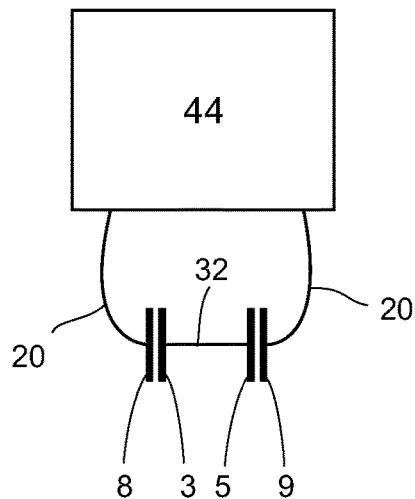
FIG. 9a-9d show a capacitive pressure sensor in alternative electrical schematics.

FIG. 9a-d show various alternatives of connecting the pressure sensor to an electronic evaluation circuit 44. In a first alternative mechanization as shown in FIG. 9a no reference electrodes are used. Instead, the first measuring electrode 38 and the second measuring electrode 39 are connected to the evaluation circuit. The total capacitance between the first measuring electrode 38 and the second measuring electrode 39 is evaluated and used to determine the fluid pressure. The first diaphragm 3, the second diaphragm 5, and the diaphragm spacer element 32 are in this case electrically conductive. Any technique known in the art of measuring capacitance may be used.

Figure 9B:
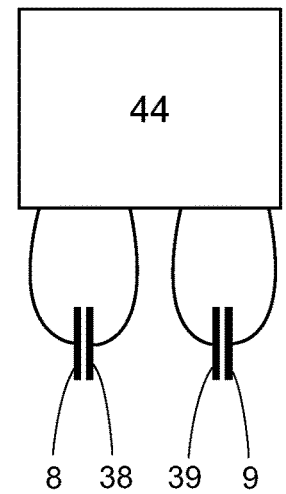

In a second alternative mechanization as shown in FIG. 9b the capacitance between the first measuring electrode 38 and the first reference electrode 8 may be measure independently of the capacitance between the second measuring electrode 39 and the second reference electrode 9. The fluid pressure is in this variant determined as a function of both measure capacitance values.

Figure 9C:
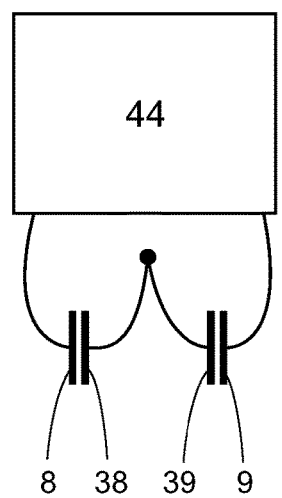

As illustrated in FIG. 9c a first reference electrode 8 and a second reference electrode 9 may be used and connected together, effectively creating a series connection of two capacitors. As shown, the capacitance between the first measuring electrode 38 and the first reference electrode 8 in series with the capacitance between the second measuring electrode 39 and the second reference electrode 9 is used to determine the fluid pressure.

Figure 9D:
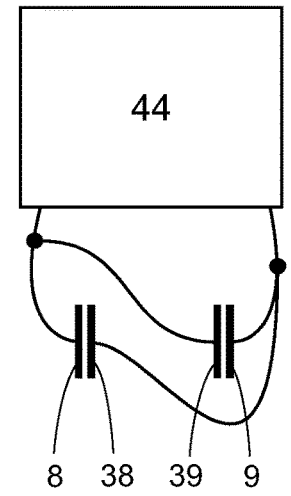

In yet another alternative as shown in FIG. 9d two capacitances may be connected in parallel. In this case the first measuring electrode 38 is connected to the second reference electrode 9 and the second measuring electrode 39 is connected to the first reference electrode 8. The total capacitance between the first measuring electrode 38 and the first reference electrode 8 in parallel with the capacitance between the second measuring electrode 39 and the second reference electrode 9 is used to determine the fluid pressure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A pressure sensor for measuring a fluid pressure, comprising:
   a fluid space formed between a first diaphragm and a second diaphragm;
   a fluid supply element connecting the fluid space with an exterior opening of the pressure sensor;
   a first measuring electrode arranged opposite the first diaphragm, the first diaphragm and the first measuring electrode forming a first capacitor having a first capacitance that varies with a change in position of the first diaphragm; and
   a second measuring electrode arrange opposite the second diaphragm, the second diaphragm and the second measuring electrode forming a second capacitor having a second capacitance that varies with a change in position of the second diaphragm,
   wherein a fluid pressure of a fluid in the fluid space is determined by evaluating the first capacitance and the second capacitance.

2. The pressure sensor as in claim 1, wherein at least one of the first diaphragm and the second diaphragm is at least partially electrically conductive.

3. The pressure sensor as in claim 1, further comprising:
a first diaphragm electrode formed on the first diaphragm; and
a second diaphragm electrode formed on the second diaphragm.

4. The pressure sensor as in claim 1, further comprising a fluid removal element connecting the fluid space with a second exterior opening of the pressure sensor.

5. The pressure sensor as in claim 4, wherein the fluid supply element and the fluid removal element are arranged at opposite ends of the fluid space.

6. The pressure sensor as in claim 1, wherein the second diaphragm is thinner than the first diaphragm.

7. The pressure sensor as in claim 1, wherein the first diaphragm and the second diaphragm have different surface areas.

8. The pressure sensor as in claim 1, wherein at least one of the first diaphragm and the second diaphragm has an at least partially flat shape when the pressure in the fluid space is the same as a reference pressure in a reference space around the fluid space.

9. The pressure sensor as in claim 1, wherein at least one of the first diaphragms and the second diaphragm has a convex or concave shape when the pressure in the fluid space is the same as a reference pressure in a reference space around the fluid space.

10. The pressure sensor as in claim 1, wherein the first diaphragm and the second diaphragm are arranged parallel to one another.

11. The pressure sensor as in claim 1, wherein at least one of the first diaphragm and the second diaphragm is disc-shaped.

12. The pressure sensor as in claim 1, wherein a distance between the first diaphragm and the second diaphragm increases with increasing pressure in the fluid space.

13. The pressure sensor as in claim 1, further comprising a first reference electrode arranged proximal to the first measuring electrode and a second reference electrode arranged proximal to the second measuring electrode.

14. The pressure sensor as in claim 13, wherein the first reference electrode is shaped as a ring or a ring sector around the first measuring electrode and the second reference electrode is shaped as a ring or a ring sector around the second measuring electrode.

15. The pressure sensor as in claim 1, wherein the first measuring electrode is provided on a first electrode support element and the second measuring electrode is provided on a second electrode support element.

16. The pressure sensor as in claim 15, wherein the electrode support elements are made of ceramic material.

17. The pressure sensor as in claim 15, further comprising a stepped spacer element wherein
an outer edge of the first diaphragm rests on a first step of the stepped spacer element, and
an outer edge of the second diaphragm rests on a second step of the stepped spacer element.

18. The pressure sensor as in claim 17, wherein an outer edge of the second electrode support element rests on a third step of the stepped spacer element.

19. The pressure sensor as in claim 1, wherein the position of the measuring electrodes is independent of the pressure in the fluid space.

20. The pressure sensor as in claim 1, wherein the measuring electrodes are integrated into an inner surface of a housing surrounding the fluid space.

21. The pressure sensor as in claim 1, further comprising a housing wherein an interior space between the housing and the fluid space forms a reference pressure chamber.

22. The pressure sensor as in claim 21, further comprising
a fluid supply element which passes through the reference pressure chamber and connects the fluid space with an inlet opening in the housing, and
a fluid removal element which passes through the reference pressure chamber and connects the fluid space with an outlet opening in the housing.

23. The pressure sensor as in claim 22, wherein the housing is hermetically sealed except for the inlet opening and the outlet opening.

24. The pressure sensor as in claim 21 wherein the housing comprises a base plate and a cover plate which are arranged approximately parallel to one another.

25. The pressure sensor as in claim 24, wherein the first diaphragm and the second diaphragm are arranged substantially parallel to the base plate and the cover plate.

26. A stacked pressure sensor for measuring a fluid pressure, comprising:
a base plate forming a lower wall of a housing;
a first spacer element arranged above the base plate;
a first diaphragm arranged above the first spacer element, an outer edge of the first diaphragm resting on the first spacer element;
a diaphragm spacer element arranged above the first diaphragm;
a second diaphragm arranged above the diaphragm spacer element, the outer edge of the second diaphragm resting at a fixed distance from the outer edge of the first diaphragm on the diaphragm spacer element;
a second spacer element arranged above the second diaphragm; and
a cover plate arranged above the second spacer element forming an upper wall of the housing.

27. The stacked pressure sensor as in claim 26, wherein the base plate and the cover plate are made of borosilicate glass.

28. The stacked pressure sensor as in claim 26, wherein maximal displacement of at least one of the first diaphragm and the second diaphragm is limited by a stop element.

29. The stacked pressure sensor as in claim 26, further comprising an evacuation orifice which can be hermetically sealed.

30. The stacked pressure sensor as in claim 26, wherein the first spacer element, the first diaphragm, and the diaphragm spacer element are integrally made of etched silicon.

31. The stacked pressure sensor as in claim 26, further comprising
a first electrode support arranged between the base plate and the first spacer element and
a second electrode support arranged between the second spacer element and the cover plate.

32. The stacked pressure sensor as in claim 31, wherein the first electrode support and the second electrode support are made of silicon dioxide.

33. The stacked pressure sensor as in claim 31, wherein the first spacer element, the diaphragm spacer element and the second spacer element are made of silicon.

34. The stacked pressure sensor as in claim 31, further comprising a first heating element arranged on the first electrode support and a second heating element arranged on the second electrode support.

35. The stacked pressure sensor as in claim 31, wherein the first electrode support and the second electrode support act as electromagnetic shields.

36. The stacked pressure sensor as in claim 26, further comprising a heating element.

37. The stacked pressure sensor as in claim 26, further comprising a getter arranged on the housing for stabilizing a reference pressure within the housing.

38. The stacked pressure sensor as in claim 26, further comprising a reference pressure sensor for monitoring the pressure within the housing.

39. The stacked pressure sensor as in claim 38, wherein the reference pressure sensor is a Pirani sensor.

40. The stacked pressure sensor as in claim 26, further comprising:
   a first measuring electrode arranged on a first electrode support;
   a first reference electrode arranged on the first electrode support;
   a second measuring electrode arranged on a second electrode support;
   a second reference electrode arranged on the second electrode support;
   a first diaphragm electrode arranged on the first diaphragm;
   a second diaphragm electrode arranged on the second diaphragm;
   an electronic evaluation circuit; and
   wires or vias operatively connecting the measuring electrodes, the reference electrodes, and the electronic evaluation circuit.

41. The stacked pressure sensor as in claim 40, wherein the electronic evaluation circuit is a provided within the stacked pressure sensor between the base plate and the cover plate.

42. The stacked pressure sensor as in claim 40, wherein the first measuring electrode and the first reference electrode are connected in series with the second measuring electrode and the second reference electrode.

43. The stacked pressure sensor as in claim 40, wherein the first measuring electrode and the first reference electrode are connected in parallel with the second measuring electrode and the second reference electrode.

* * * * *